United States Patent [19]

Tohzuka et al.

[11] Patent Number: 5,004,554
[45] Date of Patent: Apr. 2, 1991

[54] FLUORINE-CONTAINING POLYETHER AND LUBRICANT COMPRISING THE SAME

[75] Inventors: Takashi Tohzuka; Ikuo Yamamoto, both of Osaka; Yoshihiko Misugi, Hyogo, all of Japan

[73] Assignee: Daikin Industries Ltd., Osaka, Japan

[21] Appl. No.: 556,418

[22] Filed: Jul. 24, 1990

Related U.S. Application Data

[63] Continuation-in-part of Ser. No. 340,217, Apr. 19, 1989, abandoned.

[30] Foreign Application Priority Data

Apr. 19, 1988 [JP] Japan .................................. 53-97681

[51] Int. Cl.$^5$ .......................................... C10M 105/54
[52] U.S. Cl. ................................ 252/54.6; 252/52 A; 560/182; 560/184
[58] Field of Search ............. 560/182, 184; 252/52 A, 252/54.6

[56] References Cited

U.S. PATENT DOCUMENTS 3,081,342  3/1963  Ver Nooy, III .................... 252/54.6
3,361,787  1/1968  Brawn ................................. 560/184
3,412,140  11/1968 Seil et al. ........................... 252/54.6
3,646,112  2/1972  Sterling, Jr. ....................... 252/54.6
3,788,987  1/1974  Bartlett .............................. 252/54
4,836,944  6/1989  Tohzaka et al. ...................... 252/54

Primary Examiner—Jacqueline V. Howard
Attorney, Agent, or Firm—Birch, Stewart, Kolasch & Birch

[57] ABSTRACT

A fluorine-containing polyether of the formula:

$$R_f^1 CF_2 CF_2 COOR_f^2 \qquad (I)$$

or $$R_f^2 OCO-CF_2 CF_2 R'_f{}^1 CF_2 CF_2-COOR_f^2 \qquad (II)$$

wherein $R_f^1$ and $R'_f{}^1$ are each a group containing a perfluoroalkyl polyether group, and $R_f^2$ is a fluorine-containing alkyl group or a fluorine-containing ether group, can be used as a lubricant which has good properties such as lubricity and durability properties.

6 Claims, 1 Drawing Sheet

FLUORINE-CONTAINING POLYETHER AND LUBRICANT COMPRISING THE SAME

This is a continuation-in-part application of Ser. No. 07/340,217 filed on Apr. 19, 1989, now abandoned.

BACKGROUND OF THE INVENTION

1. Field of the Invention

The present invention relates to a novel fluorine-containing polyether and a lubricant comprising the same fluorine-containing polyether.

2. Description of the Related Art

A perfluoropolyether is a fluorine-containing oil which has non-flammability and good durability properties. However, the perfluoropolyether has a weak affinity to a surface of a material such as a metal or glass. When it is thinly spread, for example, on a metal surface and used as a lubricant, it has a problem such that durability is very poor because of migration. To solve this problem of the perfluoropolyether, a fluorine-containing polyether which has, at an end of the molecule, —COOH, —CH$_2$OH or —COOR wherein R is —CH$_3$ or —CH$_2$— , has been developed. However, the fluorine-containing polyether has defects in that those having the carboxyl group must be carefully treated and that properties such as lubricity or durability are insufficient.

SUMMARY OF THE INVENTION

An object of the present invention is to provide a fluorine-containing polyether which can be easily treated and has good properties such as lubricity and durability properties.

This and other objects are achieved by a fluorine-containing polyether of the formula:

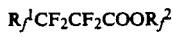  (I)

or

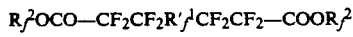  (II)

wherein $R_f^1$ and $R'_f^1$ are each a group containing a perfluoroalkyl polyether group, in which the perfluoroalkyl polyether group contains at least one repeating unit selected from the group consisting of a repeating unit of the formula:

  (a)

a repeating unit of the formula:

  (b)

and a repeating unit of the formula:
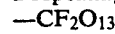  (c)

provided that at least one of the repeating units (a) and (b) is contained and the total number of the repeating units (a), (b) and (c) is at least three, and $R_f^2$ is a fluorine-containing alkyl group or a fluorine-containing ether group.

Also, the present invention provides a lubricant comprising said fluorine-containing polyether.

BRIEF DESCRIPTION OF THE DRAWING

FIGURE is an IR chart of the fluorine-containing polyether of Example 1.

DETAILED DESCRIPTION OF THE INVENTION

Figure 1:
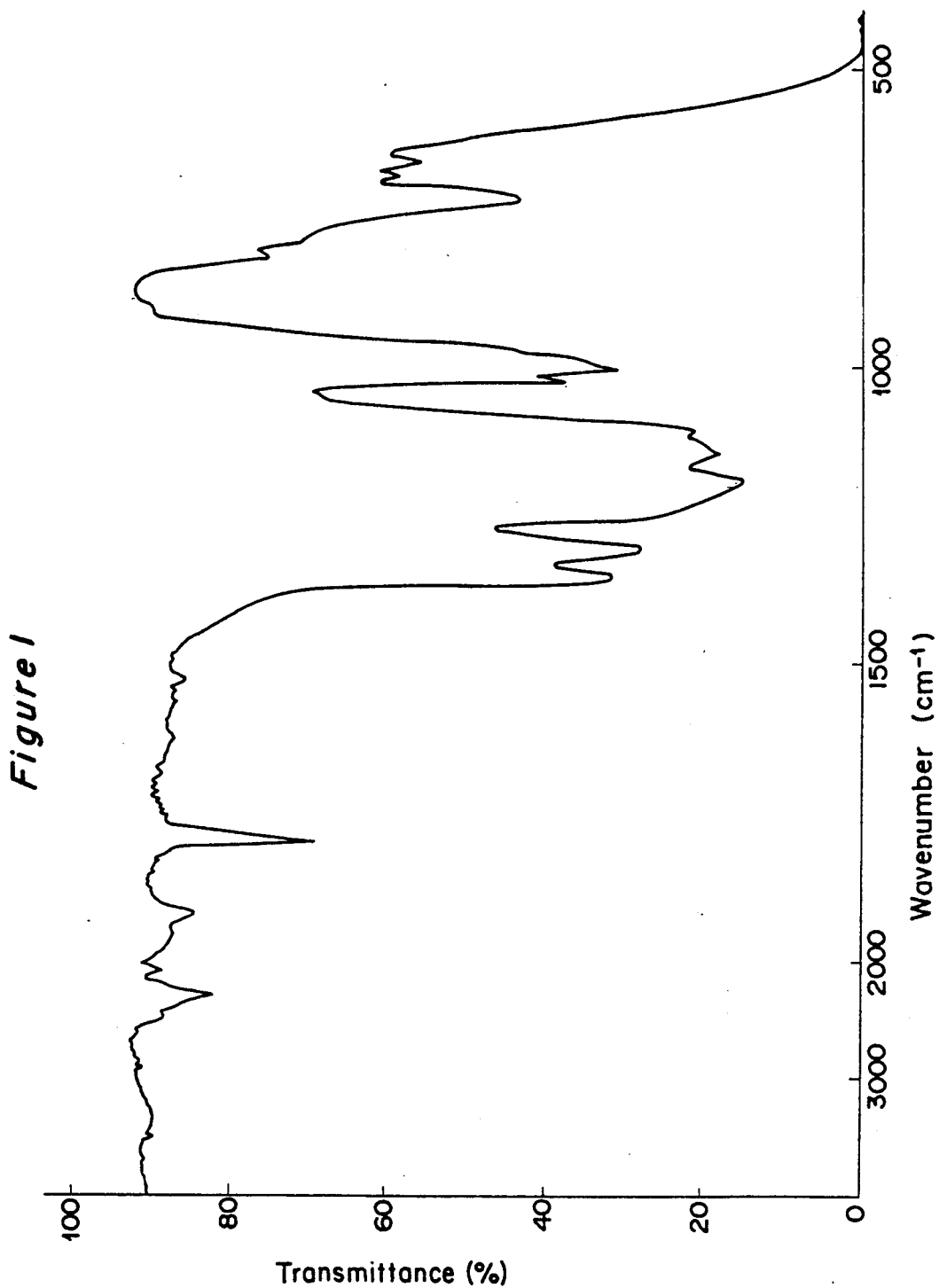

In the perfluoroalkyl polyether group, the repeating unit: —C$_3$F$_6$O— includes —CF$_2$CF$_2$CF$_2$O— and —CF(CF$_3$)CF$_2$O—. The repeating unit: —C$_2$F$_4$O— is usually —CF$_2$CF$_2$O—.

The $R_f^1$ group is, for example,

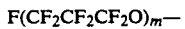

wherein m is 3 to 200.

The $R'_f^1$ group is, for example,

wherein each n is 2 to 200.

The $R_f^2$ group is, for example, $C_aF_{2a+1}C_bH_{2b}$—  (A)

wherein a is an integer of 1 to 10 and b is 1 or 2,

H(C$_2$F$_4$)$_d$CH$_2$—  (B)

wherein d is an integer of 1 to 5,
or

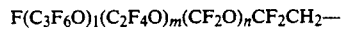  (C)

wherein l, m and n are each 0 or a positive integer provided that at least one of l and m is not 0 and l+m+n is not smaller than 3. In the fluorine-containing ether group (C), the order of each repeating unit may not be the same as described above and is arbitrary in the molecule.

Specific examples of the fluorine-containing polyether according to the present invention are F(CF$_2$CF$_2$CF$_2$O)$_m$CF$_2$CF$_2$COOCH$_2$CF$_2$CF$_3$  (1)

wherein m is 3 to 200, preferably 25 on the average,

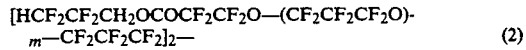  (2)

wherein m is 2 to 200, preferably 20 on the average, and

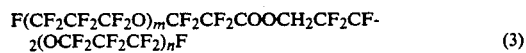  (3)

wherein m is 3 to 200, preferably 20 on the average and n is 2 to 200, preferably 20 on the average.

The fluorine-containing polyether according to the present invention can be prepared by reacting a fluorine-containing compound of the formula:

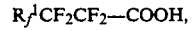

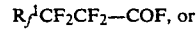

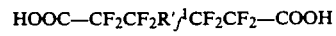

wherein $R_f^1$ and $R'^1_f$ are the same as described above, with a fluorine-containing alcohol of the formula:

$$R_f^2OH$$

wherein $R_f^2$ is the same as described above. A catalyst such as an acid (e.g. sulfuric acid) is preferably used in the reaction. The reaction is usually carried out at a temperature of 50° to 150° C. for 1 to 10 hours.

The fluorine-containing polyether according to the present invention can be used as a lubricant for materials such as a metal, glass, a silica gel and graphite. It is particularly useful as the lubricant for a thin film magnetic tape or a thin film magnetic disc.

A solution of the lubricant is preferably prepared by using a solvent so as to apply the lubricant on the surfaces of various materials. Specific examples of the solvent are fluorine-containing solvents, for example, trichlorotrifluoroethane (e.g. Daiflon S-3 manufactured by Daikin Industries, Ltd.), $Cl(CF_2CFCl)_2Cl$ and $N(C_3F_7)_3$. The solvent may be used in an amount of from 200 to 2000 parts by weight per part by weight of the lubricant.

The solution of the lubricant is then applied on a surface of a substrate such a magnetic tape or a magnetic disc by dipping or spraying, and heated to form a lubricant film. The solvent is evaporated by heating. The heating may be usually carried out at a temperature of about 80° C. The lubricant film may be formed to have a thickness of 0.002 to 0.01 μm.

The reason as to why the lubricant according to the present invention has good properties such as lubricity and durability properties is not clearly known. It is assumed that since the metal, glass, silica gel and graphite have many hydroxyl groups on their surfaces, the fluorine-containing polyether is adsorbed on their surfaces because of a transesterification occurring between the fluorine-containing polyether and the hydroxyl group. When the fluorine-containing polyether has a sufficiently higher acidity than that of the hydroxyl group on the surface, the fluorine-containing alcohol moiety of the fluorine-containing polyether quickly transesterificates with the hydroxyl group on the surface. The transesterification is achieved in the heating process to evaporate the solvent. The transesterification is completed by the frictional heat during use.

PREFERRED EMBODIMENTS OF THE INVENTION

The present invention is illustrated by the following Examples.

EXAMPLE 1

In a 200 ml three-neck flask, the fluorine-containing carboxylic acid:

$$F(CF_2CF_2CF_2O)_pCF_2CF_2COOH$$

wherein p is 25 on the average (200 g, 57 mmol) and then pentafluoropropanol (20 g, 130 mmol) were added and stirred. Then, concentrated sulfuric acid (0.5 ml) was added and the reaction was carried out at 90° C. for 5 hours while stirring. The completion of the reaction was confirmed by disappearance of the absorption peak at 1780 cm$^{-1}$ for the carboxylic acid and appearance of the absorption peak at 1820 cm$^{-1}$ for the ester linkage in IR analysis. After the completion of the reaction, the reaction product was washed with water (100 ml) and a lower phase was separated. Silica gel (30 g) was added to the lower phase to remove the unreacted carboxylic acid. The reaction product was filtrated through a filter having a pore diameter of 0.2 iμm to obtain the fluorine-containing polyether:

$$F(CF_2CF_2CF_2O)_pCF_2CF_2COOCH_2CF_2CF_3$$

wherein p is 25 on the average. Yield: 300 g (78%).

The IR chart of the resultant fluorine-containing polyether is shown in FIGURE.

EXAMPLE 2

To the fluorine-containing carboxylic acid:

$$F(CF_2CF_2CF_2O)_qCF_2CF_2COOH$$

wherein q is 20 on the average (20 g), the fluorine-containing alcohol:

$$F(CF_2CF_2CF_2O)_rCF_2CF_2CH_2OH$$

wherein r is 15 on the average (15 g) was added and stirred. Then, concentrated sulfuric acid (2 ml) was added and the reaction was carried out at 150° C. for 10 hours while stirring. The completion of the reaction was confirmed by disappearance of the absorption peak at 1780 cm$^{-1}$ for the carboxylic acid and appearance of the absorption peak at 1820 cm$^{-1}$ for the ester linkage in IR analysis. After the completion of the reaction, the reaction product was washed with water (50 ml) three times and a lower phase was separated. Silica gel (100 g) was added to the lower phase to remove the unreacted carboxylic acid. The reaction product was filtrated through a filter having a pore diameter of 0.2 μm to obtain the fluorine-containing polyether:

$$F(CF_2CF_2CF_2O)_qCF_2CF_2COOCH_2CF_2CF_2(OCF_2CF_2CF_2)_rF$$

wherein q is 20 and r is 15 on the average. Yield: 24 g (64%).

EXAMPLE 3

A two patch type hard disc having an uppermost carbon layer was dipped in a 0.1% by weight solution of the fluorine-containing polyether:

$$F(CF_2CF_2CF_2O)_pCF_2CF_2COOCH_2CF_2CF_3$$

wherein p is 25 on the average prepared in Example 1 in trichlorotrifluoroethane. The disc was removed from the solution and heated at 80° C. for one hour in an oven. A resultant lubricant film had a thickness of 0.01 μm.

The durability of the hard disc was tested by using a CSS Tester. After 20,000 times, the μ value was not more than 0.5.

COMPARATIVE EXAMPLE

A hard disc was treated in the same manner as in Example 3 but using the perfluoropolyether oil:

$$F(CF_2CF_2CF_2O)_pCF_2CF_3$$

wherein p is 25 on the average instead of the fluorine-containing polyether. A resultant lubricant film had a thickness of 0.01 μm. After 1,100 times, the μ value exceeded 0.5.

What is claimed is:

1. A fluorine-containing polyether of the formula:

$$R_f^1CF_2CF_2COOR_f^2 \quad (I)$$

or $$R_f^2OCO-CF_2CF_2R'^1_f CF_2CF_2-COOR_f^2 \quad (II)$$

wherein $R_f^1$ and $R'^1_f$ are each a group containing a perfluoroalkyl polyether group, in which the perfluoroalkyl polyether group contains at least one repeating unit selected from the group consisting of a repeating unit of the formula:

$$-C_3F_6O- \quad (a)$$

a repeating unit of the formula:

$$-C_2F_4O- \quad (b)$$

and
a repeating unit of the formula:

$$-CF_2O- \quad (c)$$

provided that at least one of the repeating units (a) and (b) is contained and the total number of the repeating units (a), (b) and (c) is at least three, and $R_f^2$ is a fluorine-containing alkyl group or a fluorine-containing ether group.

2. The fluorine-containing polyether according to claim 1, wherein the $R_f^2$ group is $$C_aF_{2a+1}C_bH_{2b}- \quad (A)$$

wherein a is an integer of 1 to 10 and b is 1 or 2, $$H(C_2F_4)_dCH_2- \quad (B)$$

wherein d is an integer of 1 to 5, or $$F(C_3F_6O)_l(C_2F_4O)_m(CF_2O)_nCF_2CH_2- \quad (C)$$

wherein l, m and n are each 0 or a positive integer provided that at least one of l and m is not 0 and l+m+n is not smaller than three.

3. The fluorine-containing polyether according to claim 1, wherein the $R_f^1$ group is $$F(CF_2CF_2CF_2O)_p-$$

wherein p is an integer of 3 to 200, and the $R_f^2$ group is $-CH_2CF_2CF_3$.

4. The fluorine-containing polyether according to claim 1, wherein the $R_f^1$ group is $$F(CF_2CF_2CF_2O)_q-$$

wherein q is an integer of 3 to 200, and the $R_f^2$ group is $$-CH_2CF_2CF_2(OCF_2CF_2CF_2)_rF$$

wherein r is an integer of 2 to 200.

5. A lubricant comprising the fluorine-containing polyether according to claim 1.

6. A fluorine-containing polyether of the formula:

$$F(CF_2CF_2CF_2O)_mCF_2CF_2COOCH_2CF_2CF_3 \quad (1)$$

wherein m is 3 to 200, $$[HCF_2CF_2CH_2OCOCF_2CF_2O-(CF_2CF_2CF_2O)_m-CF_2CF_2CF_2]_2- \quad (2)$$

wherein m is 2 to 200 or $$F(CF_2CF_2CF_2O)_mCF_2CF_2COOCH_2CF_2CF_2(OCF_2CF_2CF_2)_nF \quad (3)$$

wherein m is 3 to 200 and n is 2 to 200.

* * * * *